United States Patent [19]
Varga

[11] Patent Number: 6,150,803
[45] Date of Patent: Nov. 21, 2000

[54] DUAL INPUT, SINGLE OUTPUT POWER SUPPLY

[75] Inventor: Craig S. Varga, Mt. View, Calif.

[73] Assignee: Linear Technology Corporation, Milpitas, Calif.

[21] Appl. No.: 09/537,027

[22] Filed: Mar. 28, 2000

[51] Int. Cl.[7] .................................. G05F 1/40; H02J 1/04
[52] U.S. Cl. ............................ 323/282; 323/272; 307/60
[58] Field of Search .................................... 323/282, 283, 323/284, 285, 271, 272, 267, 287, 224; 307/64, 60, 66, 82; 327/379, 134

[56] References Cited

U.S. PATENT DOCUMENTS

| | | |
|---|---|---|
| 3,764,889 | 10/1973 | Nowell . |
| 4,137,489 | 1/1979 | Lipo . |
| 4,174,534 | 11/1979 | Kotlarewsky . |
| 4,177,389 | 12/1979 | Schott . |
| 4,194,147 | 3/1980 | Payne et al. . |
| 4,257,090 | 3/1981 | Kröger et al. . |
| 4,266,182 | 5/1981 | Boros et al. .............................. 323/267 |
| 4,359,679 | 11/1982 | Regan . |
| 4,417,197 | 11/1983 | Schwarz . |
| 4,618,779 | 10/1986 | Wiscombe ................................. 307/60 |
| 4,734,844 | 3/1988 | Rhoads . |
| 4,748,397 | 5/1988 | Ogawa et al. . |
| 4,920,309 | 4/1990 | Szepesi . |
| 4,924,170 | 5/1990 | Henze . |
| 5,122,726 | 6/1992 | Elliott et al. ............................ 323/272 |
| 5,808,453 | 9/1998 | Lee et al. ................................. 323/287 |
| 5,883,797 | 3/1999 | Amaro et al. . |
| 5,905,369 | 5/1999 | Ishii et al. . |
| 5,959,441 | 9/1999 | Brown ..................................... 323/224 |
| 5,959,443 | 9/1999 | Littlefield ................................ 323/287 |
| 5,969,512 | 10/1999 | Matsuyama . |
| 5,990,668 | 11/1999 | Coleman .................................. 323/271 |
| 6,043,634 | 3/2000 | Nguyen et al. . |

OTHER PUBLICATIONS

1992 Linear Databook Supplement at pp. 7–13 to 7–22, published by Linear Technology Corporation, Milpitas, California in 1992. No Month.

1995 Linear Databook vol. IV at pp. 4–360 to 4–373, published by Linear Technology Corporation, Milpitas, California in 1995. No Month.

1996 Linear Databook vol. V at pp. 4–212 to 4–230, published by Linear Technology Corporation, Milpitas, California in 1996. No Month.

1996 Linear Databook vol. V at pp. 4–231 to 4–258, published by Linear Technology Corporation, Milpitas, California in 1996. No Month.

Ashok Bindra, "Multiphase Controller Meets Pentium's Power Demands," Electronic Design, 46(18): 28–34 (Aug. 3, 1998).

Semtech Corp., SC1144 Datasheet, Preliminary—Aug. 4, 1998.

Semtech Corp., SC1144EVB User's Manual, Preliminary Sep. 1, 1998.

Semtech Corp., SC1144 Datasheet, Preliminary—Aug. 24, 1999.

*Primary Examiner*—Peter S. Wong
*Assistant Examiner*—Rajnikant B. Patel
*Attorney, Agent, or Firm*—Fish & Neave; Robert W. Morris; Joel Weiss

[57] ABSTRACT

Regulator circuits and regulation techniques that provide sufficient power for a given load requirement even where no single power supply in the system is adequate to satisfy the given load requirement. Circuits and techniques according to the invention use multiple switching regulators having inputs at different voltages and having a single combined output. A current-sense circuit allocates power provided to the output by the switching regulators such that each switching regulator provides a portion of the total output current, and therefore, power to the switching regulator.

62 Claims, 2 Drawing Sheets

DUAL INPUT, SINGLE OUTPUT POWER SUPPLY

BACKGROUND OF THE INVENTION

This invention relates to satisfying power requirements in electronic systems. More particularly, this invention relates to satisfying a single power requirement in electronic systems where no single power supply in the system is adequate.

Power requirements for many digital systems have increased significantly in recent years. In some systems, the power available from any given power supply in a particular system may not be adequate for a given load requirement.

It would be desirable to provide sufficient power for a given load requirement even where no single power supply in the system is adequate to satisfy the given load requirement.

SUMMARY OF THE INVENTION

It is an object of this invention to provide sufficient power for a given load requirement even where no single power supply in the system is adequate to satisfy the given load requirement.

A regulator circuit according to the invention includes a plurality of switching regulators, each switching regulator including a separate input. The regulator circuit provides a regulated output and includes at least one current-sense circuit coupled between either the regulated output or each separate input and that provides a current-sense signal to each switching regulator as a control signal used to set the power delivered by each switching regulator. The output of each switching regulator is coupled to the regulated output directly or through a resistor. The current-sense circuit allocates power provided to the regulated output by each of the switching regulators in accordance with a preferably pre-determined ratio. Thus, the regulator circuit uses multiple power supplies, each supply connected to an input of each switching regulator, and combines the outputs of the switching regulators, such that the regulator circuit is capable of providing a higher power output than any single supply in the system can provide.

A method according to the invention of regulating an output current is also provided. The method uses a regulator circuit. The regulator circuit includes multiple switching regulators. The method preferably includes sensing the output current and setting a portion of the output current provided by each of the switching regulators to provide the total output current. The setting is based on a ratio. A separate supply is used for the input of each of the switching regulators. Because the method involves providing power from a plurality of switching regulators, each regulator having a separate power supply, the method is able to provide more output power than any single power supply in the system is capable of providing.

Each embodiment of the invention preferably includes a feedback circuit coupled between the output voltage and each switching regulator that preferably sets the total power provided by the regulator circuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

Figure 1:
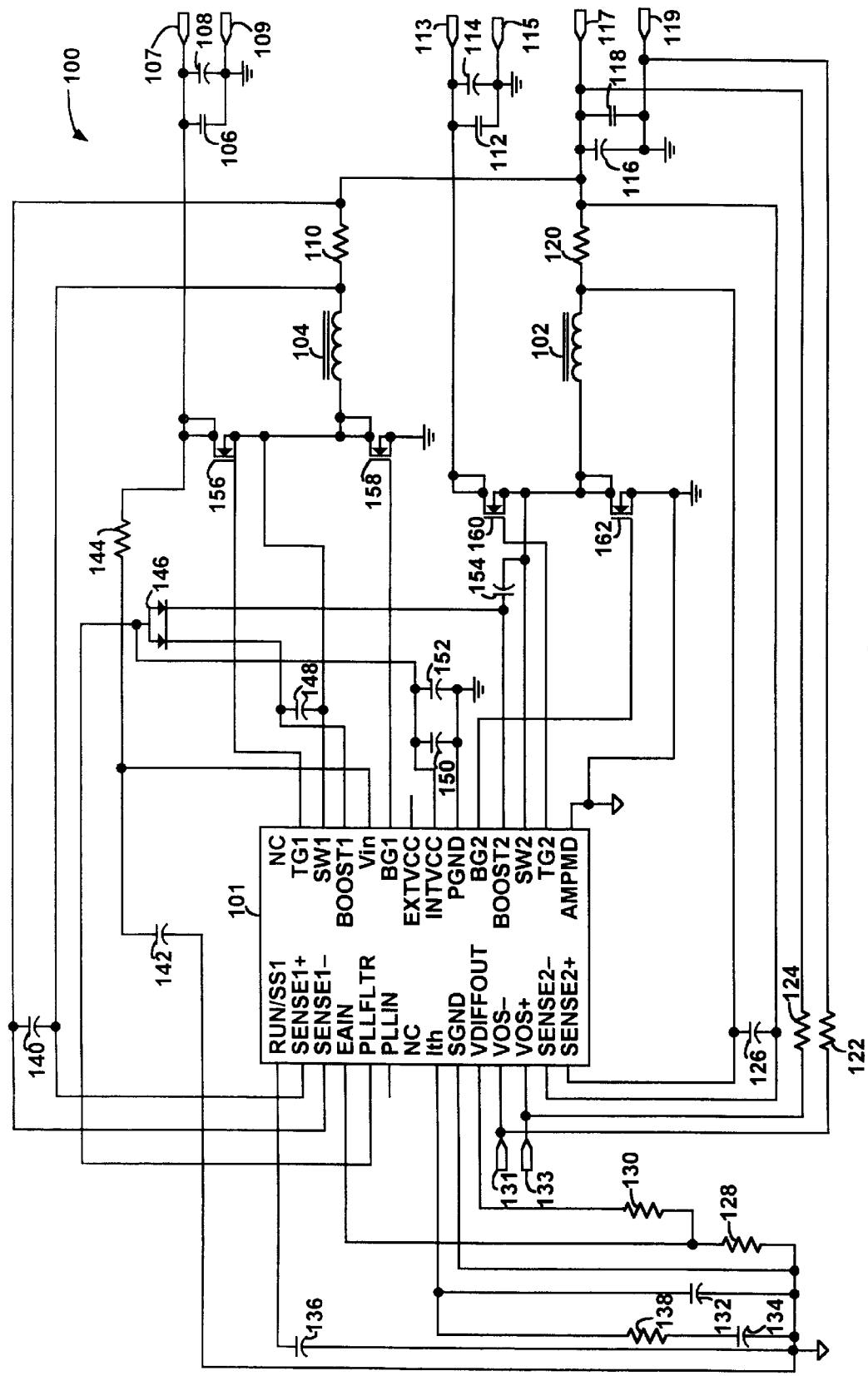
FIG. 1 is a circuit diagram of a current-mode regulator circuit according to the invention.

In any particular electronics system, the power required for a given load may not be available from a single power supply. However, there may be power supplies available in the system, none of which alone has adequate capacity, but that collectively possess sufficient power, when combined together, to satisfy the requirements of the given load.

One difficulty in combining different power sources to form a single regulated voltage is how to ensure that the correct proportions of power are drawn from each contributing supply. Another problem is how to combine the outputs of each supply into a single regulated output.

A regulator circuit according to the invention overcomes these problems by providing at least two switching regulators that regulate output voltage. Each regulator has an input that is connected to separate supply voltages. These supply voltages may be at the same or different voltage potentials as one another. The regulator circuit combines the output of each of the switching regulators into a single output. The regulator circuit also includes a current-sense circuit preferably coupled to either the output or the various inputs of each of the regulators which provides multiple current-sense signals. Each current-sense signal preferably provides a control input to each of the regulators. The current-sense circuit, also preferably allocates the power provided by each of the switching regulators to the output in accordance with a fixed ratio. This circuit architecture provides greater output power than is available from any single supply in the circuit.

The following example illustrates the operation of an exemplary circuit according to the invention. The circuit includes a 5V (volts), 2A (amperes) supply and a 12V, 1A supply. However, a load in the circuit requires 1.6V at 10A. Thus, the largest input supply is only capable of 12W (watts) and is inadequate to provide the power required by the load, 16W (P=I*V=16W).

Whereas a single power supply system, such as the power supply system described in co-pending, commonly-assigned U.S. patent application Ser. No. 09/114,384, which is herein incorporated by reference in its entirety, is limited to provide at its output only the power that the single supply provides, regulator circuits according to the invention are capable of providing more output power than any single power supply in a conventional system. The regulator circuit according to the invention uses multiple power supplies together to provide a total output power that may be greater than the capacity of each individual power supply. In the present example, the load will be shown to draw 10W of power from the 12V supply and the remaining 6W of power from the 5V supply to provide a total of 16W output power.

The regulator circuit according to the invention uses a current-sense circuit to control the power provided by each regulator to the output and also to fix the proportion of output power, in this case a ratio of 10 to 6, provided by each individual regulator. The current-sense circuit may preferably include two different current sense resistors which are used as part of the current-sense path from the output (or the input) of the regulator circuit to the various switching regulators.

Furthermore, each switching regulator can be considered a transconductance power stage—i.e., a stage that provides an output current which is proportional to the error signal (derived from a comparison of the regulated voltage to a reference voltage) and inversely proportional to the value of each sense resistor. In operation, the error signal controls the total load power, preferably through a separate feedback circuit coupled between the output and each switching regulator, while the sense resistors determine the distribution of the load power between each switching regulator.

The following description illustrates how the power output from each of the switching regulators, and from the combination of both regulators, is determined.

First, the duty factor—i.e., the approximate ON-time for a switching regulator during a single cycle—is different for each switching regulator because the duty cycle is a function of the ratio of the output voltage to the input voltage. For the 1.6V output, the 5V supply runs at a duty factor of approximately 1.6V/5V=0.32 ON-time of an exemplary cycle, while the 12V supply runs at approximately 1.6V/12V=0.13 ON-time of an exemplary cycle.

During an exemplary cycle, the instantaneous input current during the ON-portion of the cycle to each switching regulator is equal to that switching regulator's output current. Thus, the average input current for each switching regulator is equal to the output current of that regulator multiplied by the duty factor of that regulator.

Thus, as per the present illustration, the portion of the Iout (total output current) supplied by the 5V supply is:

$$I\text{out}*(6W/16W)=0.38*I\text{out}$$

The portion of Iout supplied by the 12V supply is:

$$I\text{out}*(10W/16W)=0.63*I\text{out}.$$

The respective input currents (assuming 100% conversion efficiency for simplicity) are:

6W/5V=1.20A from the 5V supply and

10W/12V=0.83A from the 12V supply.

It should be noted that the resistive value of each of the current sense resistors is inversely proportional to the power that it causes each supply to provide. Therefore, in this particular example, the resistor used for the 12V supply will be in a 6 to 10 ratio with the resistor used for the 5V supply. In addition, the relative values of the sense resistors allocate total power provided by relatively slightly adjusting the duty cycle of each of the switching regulators.

Furthermore, by properly ratioing two current sense resistors in the current-sense circuit of two switching regulator power supplies, the two different power supplies can be utilized to provide a single combined and scaled power supply. These supplies may preferably provide a total output power that exceeds the maximum output power of each individual supply. By adjusting the relative values of the sense resistors, the relative power supplied by each of the two switching regulators can be scaled as required by the particular implementation—i.e., more or less power can be drawn from each of the switching regulators and the power supplied by each of the switching regulators does not necessarily have to be equal.

FIG. 1 shows a preferred embodiment of the regulator circuit 100 according to the invention.

In one embodiment, regulator circuit 100 can be implemented using a buck (or step-down) regulator controller such as the LTC1629 (element 101 shown in FIG. 1), manufactured by Linear Technology Corp. of Milpitas, Calif. This is a PolyPhase™ synchronous buck regulator controller designed to power a single output from a single input with at least two switching regulators connected in parallel in an anti-phase configuration where each switching regulator runs substantially out-of-phase with the other switching regulator. The operation of the LTC1629 is described in detail in the data sheet of the LTC1629 which is hereby incorporated by reference herein in its entirety.

In this particular embodiment of the invention, the regulator circuit uses at least two current-mode buck switching regulators located in the LTC1629 having their respective outputs connected together, and each of their inputs connected to a unique one of the various input power sources.

The LTC1629 also includes an error amplifier that controls the feedback to at least two buck regulators. The error amplifier controls the cycle by cycle voltage across each current sense resistor, thereby forcing current sharing between the two buck regulators in inverse proportion to the values of the sense resistors. The '384 application describes the basic workings of the multi-switching regulator, multi-phase circuit.

Typically, the LTC1629 utilizes a single supply to provide a regulated output. The modification of the multi-switching regulator, multi-phase circuit in accordance with the principles of the present invention, provides a regulator circuit that satisfies the 16W load requirement of the exemplary circuit described above by combining the two different supply sources into a single power output.

In FIG. 1, the LTC1629 is used to illustrate the invention using two current sense resistors 110 and 120, each of a pre-determined value. FIG. 1 also shows various operational circuitry which may be used to operate the chip but is not required for implementation of the invention. It should be noted that while the LTC1629 is shown in FIG. 1, the principles of the present invention may be implemented using various other controller circuits. Thus, persons skilled in the art will appreciate that the present invention is in no way limited to circuits utilizing the LTC1629.

The following is a short description of the operation of the LTC1629 (shown in FIG. 1 as element 101). However, the LTC1629 data sheet, available at http:www.linear-tech.com and hereby incorporated by reference herein in its entirety, describes the operation of the LTC1629 in detail.

Outputs TG1 and TG2 are high current gate drives for top N-Channel (in the description of the LTC1629, each individual switching regulator is referred to as a channel) MOSFETs. The MOSFET gates attached to these pins are driven by outputs from these pins.

Pins SW1 and SW2 are the supplies for the switch node connections to the inductors.

Pins BOOST1 and BOOST2 are bootstrapped supplies to the top side floating drivers. Capacitors may be connected between the boost and switch pins and Schottky diodes may be tied between the boost and INTVcc pins.

The Vin pin is where the LTC1629 is connected to the main supply pin. A bypass capacitor may preferably be tied between this pin and the signal ground pin.

Pin EXTVcc is an external power input to an internal switch connected to the INTVcc.

Pin INTVcc is the output of an internal 5V linear low dropout regulator and the EXTVcc switch. The driver and control circuits are powered from this voltage source. This pin may preferably be decoupled to power ground with a minimum of 4.7 µF tantalum or other low ESR capacitor.

Pin PGND is the driver power ground. It may be connected to the sources of bottom N-channel MOSFETs and the anodes of the Schottky rectifiers.

Pin AMPMD is the logic input pin that controls the connections of internal precision resistors that configure an operational amplifier within the chip as a unity-gain differential amplifier.

Pins SENSE1+ and SENSE2+ are the positive inputs to the differential current comparators on the LTC1629.

Pins SENSE1− and SENSE2− are the negative inputs to the differential current comparators on the LTC1629.

Pins VOS+ and VOS− are the inputs to the operational amplifier within the chip. Internal precision resistors capable of being electronically switched in or out can configure it as a differential amplifier or an uncommitted operational amplifier.

The VDIFFOUT pin is the output of differential amplifier that provides true remote output voltage sensing. This pin typically drives an external resistive divider that sets the output voltage.

The SGND Pin is the small signal ground common to both controllers.

The Ith pin is the error amplifier output and switching regulator compensation point. Both channels' current comparator trip point increases with this control voltage.

The PLLIN pin is the external synchronization input to a phase detector within the chip.

The PLLFLTR pin is the phase-locked loop's low pass filter connection. This pin can be driven with an AC or DC voltage source to vary the frequency of an internal oscillator.

The EAIN pin is the input to the error amplifier that compares the feedback voltage to the internal 0.8V reference voltage.

The RUN/SS pin is a combination soft-start, run control input and short-circuit detection timer. Forcing this pin below 0.8V causes the IC to shut down all internal circuitry.

The NC pin shows that these pins are not connected in this particular embodiment.

The following table shows exemplary values of the elements in FIG. 1, but in no way limits the present invention.

| Element Number | Exemplary Value (or Part Number) |
| --- | --- |
| 101 | LTC1629 |
| 102 | CEE 125-7R0 |
| | 7 μH, 4A |
| 104 | CEE 125-7R0 |
| | 7 μH, 4A |
| 106 | 1 μF |
| 107 | 12 V + input (Al. Elect. Sanyo 16MV470AX |
| 108 | 470 μF, 16 V |
| 109 | 12 V − input |
| 110 | .007Ω, ¼W |
| 112 | 1 μF |
| 113 | 5 V + input (Al. Elect. Sanyo 6MV1500AX) |
| 114 | 1500 μF, 6.3 V |
| 115 | 5 V − input |
| 116 | 1500 μF, 6.3 V |
| 117 | Positive Output Voltage |
| 118 | 1 μF |
| 119 | Negative Output Voltage |
| 120 | .007Ω, ¼W |
| 122 | 100Ω |
| 124 | 100Ω |
| 126 | 1000 pF |
| 128 | 20k, 1% |
| 130 | 19.9k, 1% |
| 131 | Vosense+ |
| 132 | 1200 pF |
| 133 | Vosense− |
| 134 | optional |
| 136 | .1 μF |
| 138 | optional |

-continued

| Element Number | Exemplary Value (or Part Number) |
| --- | --- |
| 140 | 1000 pF |
| 142 | 1 μF |
| 144 | 10Ω |
| 146 | D1 BAT54A |
| 148 | .22 μF |
| 150 | 1 μF |
| 152 | 10 μF, 10 V Tantalum |
| 154 | .22 μF |
| 156 | Q1A FDS6990A |
| 158 | Q1B FDS6990A |
| 160 | Q2A FDS6990A |
| 162 | Q2B FDS6990A |

Circuit 100 includes inductors 102 and 104; capacitors 106, 108, 112, 114, 116, 118, 126, 128, 130, 132, 134, 136, 140, 142, 148, 150, 152 and 154; voltage supplies 107/109 (12V supply) and 113/115 (5V supply); outputs 117/119 and 131/133 (outputs 131/133 are adjusted outputs which reflect the output voltages of the circuit at 117/119); resistors 122, 124, 128, 130, 138 and 144; diode 146; and MOSFET transistors 156, 158, 160, and 162.

Sense resistors 110 and 120 form part of the current-sense portion of circuit 100. Sense resistor 110 conducts the output current delivered by inductor 102 to output 117 and sense resistor 110 conducts the output current delivered by inductor 104 to output 117. The voltage across each sense resistor caused by the output current is transmitted to the individual switching regulators within the LTC1629. While the total power delivered to the output is proportional to the output voltage (outputs 117 and 119 provide the output voltage to a feedback circuit coupled to Vos+ and Vos− at pins 131 and 133 to control the total output voltage required by the combination of the switching regulators) the relative voltages across the sense resistors, which are typically forced to be equal, determine the relative current, and therefore, power delivered by each of the switching regulators. By adjusting the relative values of the sense resistors, the relative power supplied by each of the two switching regulators can be scaled as required by the particular implementation. Thus, more or less power can be drawn from each switching regulator.

In one embodiment of the invention, a regulator circuit may use the out-of-phase configuration described above to help cancel inductor output ripple currents. This technique is described in greater detail in the '384 application discussed above. The present invention can further implement the out-of-phase technique by adjusting the values of the sense resistors so as to provide optimum cancellation between the output ripple currents present in each switching regulator. This cancellation is implemented by matching the output ripple currents in each switching regulator and then running the switching regulators in an out-of-phase manner. This minimizes the output ripple current. Nevertheless, it is not required that the regulators operate out-of-phase in order to share power among various input sources according to the invention. Though the output ripple current cancellation benefit would be lost, the system would still be functional.

In other alternative embodiments, the current-sense circuit may monitor the input current to each switching regulator and allocate power to each switching regulator based on the input current, as opposed to monitoring and allocating based on the output current.

In another alternative embodiment, the invention could be implemented using voltage-mode switching regulators. In this embodiment, the inductor current is not used as a cycle by cycle control parameter with the error voltage directly controlling duty factor. Instead, the error voltage directly controls the duty factor.

Figure 2:
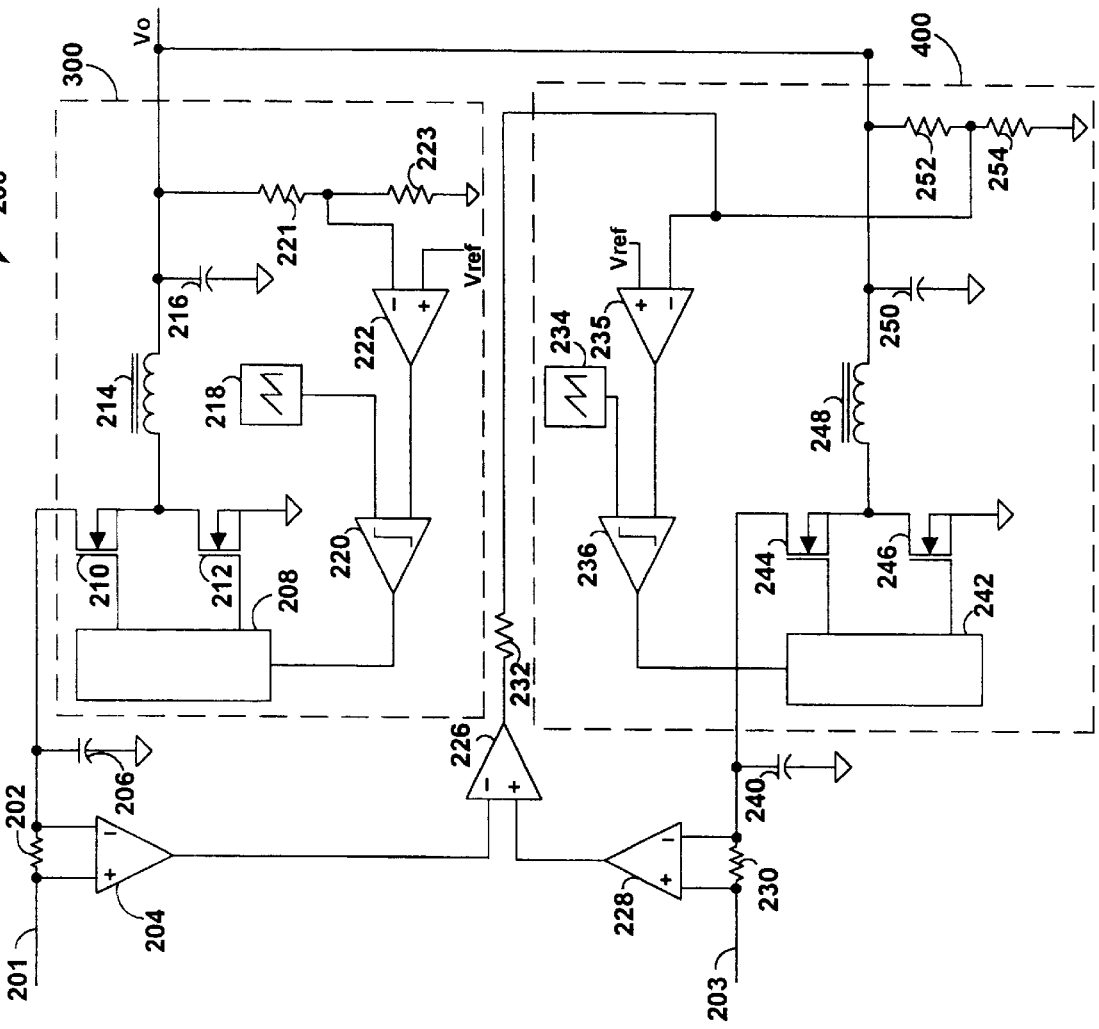
FIG. 2 is a circuit diagram of a voltage-mode regulator circuit according to the invention.

FIG. 2 shows a schematic diagram of a voltage-mode regulator circuit 200 according to the invention. Circuit 200 includes switching regulators 300 and 400, as indicated by the dashed-line boxes. Circuit 200 also includes the following individual components: supply voltages 201 and 203; current sense resistors 202 and 230; current sense differential amplifiers 204 and 228; current error amplifier 226; drivers 208 and 242; MOSFETS 210, 212, 244 and 246; inductors 214 and 248; pulse-width modulators 220 and 236; oscillators 218 and 234; current-sense error amplifiers 222 and 235; resistors 221, 223, 232, 252 and 254; and capacitors 206, 216, 240 and 250. These individual components form the individual switching regulators and an additional feedback loop preferably included in circuit 200, as will be explained.

Circuit 200 operates as follows. The output voltage is sensed at the output, Vo, and fed back to error amplifiers 222 and 235. Pulse-width modulator circuits 220 and 236 combine inputs from oscillators 218 and 234 together with the current-sense signals from error amplifiers 222 and 235 in order to control driver circuits 208 and 242. Driver circuits 208 and 242 govern the duty cycle of MOSFETS 210 and 244 and MOSFETS 212 and 246. (MOSFETS 210 and 244 deliver current to inductors 214 and 248 during the ON portion of the duty cycle and MOSFETS 212 and 246 ground the inductors during the OFF portion of the duty cycle.)

In circuit 200, scaling in the current-sense path of each switching regulator, which sets the amount of power provided by each switching regulator, may preferably be implemented by scaling resistors 221, 223, 252 and 254.

The additional feedback loop is provided through current sense resistors 202 and 230, current sense differential amplifiers 204 and 228, current error amplifier 226 and resistor 232. This loop provides an additional layer of regulation by comparing the input current of each switching regulator and adding the error signal obtained therefrom to the output voltage feedback signal of one of the switching regulators. This substantially matches the current of regulator 400 to the current of regulator 300 in a ratio which is a function of the relative values of resistor 202 and resistor 203.

The principles of operation of this circuit with respect to the combination and distribution of power from each independent supply are substantially the same as the principles of the current-mode circuit. Therefore, regulator circuit 200 can supply more power than either of the individual input power supplies. It should be noted that the additional feedback loop of the circuit which is shown in FIG. 2 as being implemented in the switching regulator inputs, can be implemented at the output of the circuit using current sense resistors in the output path or in any other suitable manner to force current sharing between channels.

In other alternative embodiments of the invention, the switching regulators used may be either multi-switching regulator boost regulators or multi-switching regulator SEPIC (Single-Ended Parallel Inductor Current) designs by switching the integrated circuit (in the circuit described above, the integrated circuit was the LTC1629) and the associated application circuitry. The invention also may be used in transformer-coupled designs such as flyback and forward converters. The design of the basic circuit according to the invention, however, remains the same.

In other alternative embodiments, a regulator circuit according to the invention may be used for supplies requiring redundant input power sources. If one of the two input sources should fail, the output can be maintained by the remaining input source.

Though the above-described examples discuss two-input designs, the present invention can be practiced with any number of supplies (greater than one), and, therefore, there is no fundamental limit to the number of supplies which can be utilized with this technique.

Thus, it is seen that regulator circuits and regulation techniques are provided that satisfy the load requirements of a given load by allocating power supplied between different input supply sources. Persons skilled in the art will appreciate that the present invention can be practiced by other than the described embodiments, which are presented for purposes of illustration rather than of limitation, and the present invention is limited only by the claims which follow.

What is claimed is:

1. A regulator circuit for providing a regulated output, the regulator circuit comprising:

a plurality of switching regulators, each switching regulator including a separate input, each switching regulator including an output coupled to the regulated output and each switching regulator including an independent pulse width modulator circuit; and a plurality of current-sense circuits, each current-sense circuit coupled between the regulated output and each switching regulator and that utilizes the pulse width modulator circuit in each switching regulator to allocate current provided to the regulated output from each of the switching regulators in accordance with a ratio such that more than one switching regulator provides a portion of the regulated output.

2. The regulator circuit of claim 1, wherein each input to each switching regulator is at a different voltage.

3. The regulator circuit of claim 1, wherein each input to each switching regulator is at the same voltage.

4. The regulator circuit of claim 1, wherein said ratio is fixed.

5. The regulator circuit of claim 1, wherein each current-sense circuit of the plurality of current sense circuits comprises a fixed resistor.

6. The regulator circuit of claim 1, wherein each current-sense circuit of the plurality of current-sense circuits comprises a current sense resistor.

7. The regulator circuit of claim 1, wherein each of the switching regulators is a current-mode switching regulator.

8. The regulator circuit of claim 1, wherein each of the switching regulators is a voltage-mode switching regulator.

9. The regulator circuit of claim 1, wherein each of the switching regulators is a step-down regulator.

10. The regulator circuit of claim 1, wherein each of the switching regulators is a step-up regulator.

11. The regulator circuit of claim 1, wherein each of the switching regulators operates out-of-phase with one another.

12. The regulator circuit of claim 1, wherein each of the switching regulators operates in-phase with one another.

13. A regulator circuit for providing a regulated output, the regulator circuit comprising:

a plurality of switching regulators, each switching regulator including a separate input, each switching regulator including an output coupled to the regulated output and each switching regulator including an independent pulse width modulator circuit; and a plurality of current-sense circuits, each current-sense circuit coupled between each input and each switching regulator and that utilizes the pulse width modulator circuit in each switching regulator to allocate current provided to the regulated output from each of the switching regulators in accordance with a ratio such that more than one switching regulator provides a portion of the regulated output.

14. The regulator circuit of claim 13, wherein each input to each switching regulator is at a different voltage.

15. The regulator circuit of claim 13, wherein each input to each switching regulator is at the same voltage.

16. The regulator circuit of claim 13, wherein said ratio is fixed.

17. The regulator circuit of claim 13, wherein each current-sense circuit of the plurality of current sense circuits comprises a fixed resistor.

18. The regulator circuit of claim 13, wherein each current-sense circuit of the plurality of current-sense circuits comprises a current sense resistor.

19. The regulator circuit of claim 13, wherein each of the switching regulators is a current-mode switching regulator.

20. The regulator circuit of claim 13, wherein each of the switching regulators is a voltage-mode switching regulator.

21. The regulator circuit of claim 13, wherein each of the switching regulators is a step-down regulator.

22. The regulator circuit of claim 13, wherein each of the switching regulators is a step-up regulator.

23. The regulator circuit of claim 13, wherein each of the switching regulators operates out-of-phase with one another.

24. The regulator circuit of claim 13, wherein each of the switching regulators operates in-phase with one another.

25. A method of regulating an output voltage using a regulator circuit, said regulator circuit including multiple switching regulators, the method comprising:
    sensing an output current;
    allocating a portion of said output current provided by each of said switching regulators by independently controlling a duty cycle of each switching regulator, said allocating being based on a ratio; and
    using a separate supply input for each of the switching regulators.

26. The method of claim 25, said using a separate supply input for each of the switching regulators comprising using a separate supply input, each input being at a different voltage.

27. The method of claim 25, wherein said allocating comprises allocating a portion of said output current provided by each of said switching regulators, each of said portions being different.

28. The method of claim 25, wherein said allocating comprises allocating according to a fixed ratio.

29. The method of claim 25, wherein said allocating comprises allocating according to a pre-determined ratio.

30. A method of regulating an output voltage using a regulator circuit, said regulator circuit including multiple switching regulators, the method comprising:
    sensing the output voltage;
    independently controlling a duty cycle of each switching regulator based on an input voltage and the output voltage;
    further controlling each of the duty cycles in order to maintain a ratio between output currents provided by each of the switching regulators; and
    using a separate supply input for each of the switching regulators.

31. The method of claim 30, said using a separate supply input for each of the switching regulators comprising using a separate supply input, each input being at a different voltage.

32. The method of claim 30, wherein said further controlling comprises allocating a portion of said output current provided by each of said switching regulators, each of said portions being different.

33. The method of claim 32, wherein said allocating comprises allocating according to a fixed ratio.

34. The method of claim 32, wherein said allocating comprises allocating according to a pre-determined ratio.

35. A regulator circuit for providing a regulated output, the regulator circuit comprising:
    a plurality of switching regulators, each switching regulator including a separate input, each switching regulator including an output coupled to the regulated output and each switching regulator including an independent pulse width modulator circuit;
    a feedback circuit coupled between the regulated output and each switching regulator that sets the total current provided by the regulator circuit; and
    a plurality of current-sense circuits, each current-sense circuit coupled between the regulated output and each switching regulator and that utilizes the pulse width modulator circuit in each switching regulator to allocate current provided to the regulated output from each of the switching regulators in accordance with a ratio such that more than one switching regulator provides a portion of the regulated output.

36. The regulator circuit of claim 35, wherein each input to each switching regulator is at a different voltage.

37. The regulator circuit of claim 35, wherein each input to each switching regulator is at the same voltage.

38. The regulator circuit of claim 35, wherein said ratio is fixed.

39. The regulator circuit of claim 35, wherein each current-sense circuit of the plurality of current sense circuits comprises a fixed resistor.

40. The regulator circuit of claim 35, wherein each current-sense circuit of the plurality of current-sense circuits comprises a current sense resistor.

41. The regulator circuit of claim 35, wherein each of the switching regulators is a current-mode switching regulator.

42. The regulator circuit of claim 35, wherein each of the switching regulators is a voltage-mode switching regulator.

43. The regulator circuit of claim 35, wherein each of the switching regulators is a step-down regulator.

44. The regulator circuit of claim 35, wherein each of the switching regulators is a step-up regulator.

45. The regulator circuit of claim 35, wherein each of the switching regulators operates out-of-phase with one another.

46. The regulator circuit of claim 35, wherein each of the switching regulators operates in-phase with one another.

47. A regulator circuit for providing a regulated output, the regulator circuit comprising:
    a plurality of switching regulators, each switching regulator including a separate input, each switching regulator including an output coupled to the regulated output and each switching regulator including an independent pulse width modulator circuit;
    a feedback circuit coupled between the regulated output and each switching regulator that sets the total current provided by the regulator circuit; and
    a plurality of current-sense circuits, each current-sense circuit coupled between each input and each switching regulator and that utilizes the pulse width modulator circuit in each switching regulator to allocate current provided to the regulated output from each of the switching regulators in accordance with a ratio such that more than one switching regulator provides a portion of the regulated output.

48. The regulator circuit of claim 47, wherein each input to each switching regulator is at a different voltage.

49. The regulator circuit of claim 47, wherein each input to each switching regulator is at the same voltage.

50. The regulator circuit of claim 47, wherein said ratio is fixed.

51. The regulator circuit of claim 47, wherein each current-sense circuit of the plurality of current sense circuits comprises a fixed resistor.

52. The regulator circuit of claim 47, wherein each current-sense circuit of the plurality of current-sense circuits comprises a current sense resistor.

53. The regulator circuit of claim 47, wherein each of the switching regulators is a current-mode switching regulator.

54. The regulator circuit of claim 47, wherein each of the switching regulators is a voltage-mode switching regulator.

55. The regulator circuit of claim 47, wherein each of the switching regulators is a step-down regulator.

56. The regulator circuit of claim 47, wherein each of the switching regulators is a step-up regulator.

57. The regulator circuit of claim 47, wherein each of the switching regulators operates out-of-phase with one another.

58. The regulator circuit of claim 47, wherein each of the switching regulators operates in-phase with one another.

59. A regulator circuit comprising:

a regulated output; and a plurality of switching regulators, each switching regulator comprising:
 a separate input;
 an output coupled to the regulated output;
 an independent pulse width modulator circuit; and
 a current-sense circuit coupled to the regulated output and the pulse-width modulator circuit, and that utilizes the pulse width modulator circuit to allocate current provided to the regulated output from the switching regulator in accordance with a ratio such that the switching regulator provides a portion of the regulated output.

60. A regulator circuit for providing a regulated output, the regulator circuit comprising:

a regulated output; and a plurality of switching regulators, each switching regulator comprising:
 a separate input;
 an output coupled to the regulated output;
 an independent pulse width modulator circuit; and
 a current-sense circuit coupled to the input and the pulse width modulator circuit, that utilizes the pulse width modulator circuit to allocate current provided to the regulated output from the switching regulator in accordance with a ratio wherein the switching regulator provides a portion of the regulated output.

61. A regulator circuit for providing a regulated output, the regulator circuit comprising:

a plurality of switching regulators, each switching regulator comprising:
 a separate input;
 an output coupled to the regulated output;
 an independent pulse width modulator circuit; and
 a current-sense circuit coupled to the regulated output and the pulse width modulator circuit that utilizes the pulse width modulator circuit to allocate current provided to the regulated output from the switching regulator in accordance with a ratio such that the switching regulator provides a portion of the regulated output; and a feedback circuit coupled between the regulated output and each switching regulator that sets the total current provided by the regulator circuit.

62. A regulator circuit for providing a regulated output, the regulator circuit comprising:

a plurality of switching regulators, each switching regulator comprising:
 a separate input;
 an output coupled to the regulated output;
 an independent pulse width modulator circuit; and
 a current-sense circuit coupled to the input and to the pulse width modulator circuit that utilizes the pulse width modulator circuit to allocate current provided to the regulated output from the switching regulator in accordance with a ratio such that the switching regulator provides a portion of the regulated output; and a feedback circuit coupled between the regulated output and each switching regulator that sets the total current provided by the regulator circuit.

* * * * *

UNITED STATES PATENT AND TRADEMARK OFFICE
CERTIFICATE OF CORRECTION

PATENT NO. : 6,150,803
DATED : November 21, 2000
INVENTOR(S) : Craig S. Varga

It is certified that error appears in the above-identified patent and that said Letters Patent is hereby corrected as shown below:

Column 7,
Line 2, change "error voltage directly" to -- error voltage indirectly --.
Line 14, change "current - sense" to -- output voltage --.

Signed and Sealed this

Eighteenth Day of September, 2001

Attest:

NICHOLAS P. GODICI
Attesting Officer  Acting Director of the United States Patent and Trademark Office